United States Patent [19]

Smith

[11] 3,847,636

[45] Nov. 12, 1974

[54] ABSORBENT ALLOY FIBERS OF SALTS OF CARBOXYALKYLATED STARCH AND REGENERATED CELLULOSE

[75] Inventor: Frederick R. Smith, Wilmington, Del.

[73] Assignee: FMC Corporation, Philadelphia, Pa.

[22] Filed: Apr. 20, 1973

[21] Appl. No.: 352,933

Related U.S. Application Data

[63] Continuation-in-part of Ser. No. 259,943, June 5, 1972, abandoned.

[52] U.S. Cl. ............................. 106/168, 106/197 C
[51] Int. Cl. ..................... C08b 21/22, C08b 21/30
[58] Field of Search ....................... 106/168, 197 C; 260/233.3 R

[56] References Cited
UNITED STATES PATENTS
3,187,747  6/1965  Burgeni............................. 106/165
2,495,767  1/1950  Reid................................... 106/169
3,438,794  4/1969  Ritson............................ 106/197 C Primary Examiner—Theodore Morris

[57] ABSTRACT

Absorbent fibers of an alloy of salts of carboxyalkylated starch and regenerated cellulose, especially useful for absorbing body fluids, are prepared from a mixture of viscose and an alkaline starch solution treated with a carboxyalkyl etherifying compound to produce an alkaline solution of carboxyalkylated starch. This starch solution is mixed with viscose and the mixture extruded into a coagulating medium in the form of fibers. The wet gel fibers may, if necessary, be treated with a salt-forming compound for the carboxyalkylated starch and dried, preferably with a finish, for cellulose fibers thereon.

7 Claims, No Drawings

ABSORBENT ALLOY FIBERS OF SALTS OF CARBOXYALKYLATED STARCH AND REGENERATED CELLULOSE

This application is a continuation-in-part of copending application Ser. No. 259,943, filed June 5, 1972, now abandoned.

In the past, it has been known that fibers suitable for absorbing body fluids may be produced by incorporating sodium carboxymethyl cellulose in viscose and spinning this mixture into alloy fibers. While the above alloy fibers are quite useful, they are relatively expensive to produce in a form suitable for non-wovens, absorbent pads, tampons and the like. The sodium carboxymethyl cellulose-regenerated cellulose alloy fiber is difficult to finish and dry to cardable form from an aqueous system. These fibers may be readily finished and dried by solvent exchange but this system adds considerably to the cost of manufacturing.

It is an object of this invention to provide an absorbent alloy fiber of a salt of carboxyalkylated starch and regenerated cellulose.

It is an object of this invention to provide a method of forming an absorbent alloy fiber of a salt of carboxyalkylated starch and regenerated cellulose.

These and other objects are accomplished in accordance with this invention which is an absorbent alloy fiber of a matrix of regenerated cellulose having a salt of carboxyalkylated starch uniformly dispersed therein. The alky radical of the carboxyalkyl group has from one to three carbon atoms. The regenerated cellulose comprises at least a major proportion of the fiber mass.

The method of preparing the alloy fiber comprises reacting alkali starch with a carboxyalkyl etherifying agent in an aqueous medium, mixing the alkaline carboxyalkylated starch solution with viscose, forming the mixture into a fiber, coagulating and regenerating the fiber, and treating the fiber with a lubricating finish composition for cellulose.

The alloy fiber, which is formed predominantly from viscose, is coagulated and regenerated by known means and preferably in an acid bath containing sulfuric acid and sodium sulfate. Zinc sulfate is often incorporated in the bath as well as other coagulation modifiers, as desired.

Since, in accordance with this invention, it is necessary to obtain a product wherein the starch derivative is in the form of a salt, the wet gel fibers, after coagulation and regeneration in an acid bath are treated with a salt-forming compound in solution to return the starch derivative from the acid state to the salt. Preferably, the salt-forming compound is an alkali metal, alkaline earth metal or ammonium salt-forming compound. Alkaline earth metals include magnesium. Examples of salt-forming compounds for the carboxylated starch include sodium, potassium or lithium carbonate, dibasic ammonium phosphate, dibasic sodium phosphate, tribasic sodium phosphate, sodium metaborate, dibasic potassium phosphate, potassium metaborate, magnesium acetate, magnesium chloride, calcium chloride, calcium acetate, zinc acetate, zinc sulfate and the like. Examples of other metals whose compounds can be used as salt formers include barium, strontium, titanium, chromium, manganese, iron, cobalt, nickel, copper, cadmium, aluminum and tin. Examples of other anions used with those metals include hydroxides, bicarbonates, nitrates, formates, propionates and benzoates. Amines and amine salts are also useful salt formers for the acidic carboxylated starch. These include both mono-, poly- and heterocyclic amines. Tertiary amines or their salts, quaternary amines or their salts, are useful salt formers. Examples of amines which are useful include ethyl amine, propyl amine, dimethyl amine, diethyl amine, butyl methyl amine, methylethyl amine, trimethyl amine, tripropyl amine, tributyl amine, triethyl ammonium bromide, piperidine, pyridine, ethylene diamine, triethylene tetramine, tetramethyl ammonium hydroxide and the like.

The starch which is useful for this invention is derived from any plant source including corn, wheat, tapioca, potatoes, etc. The starch is preferably unmodified but may have been treated with alkali, acids, enzymes or oxidizing agents. Soluble or partially soluble modified starches are also suitable.

Carboxyalkyl etherifying agents are well known in the art and include, for example, acrylonitrile, methacrylonitrile, methacrylamide, acrylamide, acrylic acid, maleic anhydride, maleic acid, fumaric acid, crotonic acid, halogenated fatty acids or their salts including monochloroacetic acid, bromo- or chloropropionic acid, bromoisobutyric acid, bromosuccinic acid or the like. Acrylonitrile is the preferred carboxyalkyl etherifying agent based on facilitation of the chemical process and will be used hereinafter to demonstrate this invention. While sodium hydroxide is the preferred base for the etherifying reaction and will be used hereinafter to demonstrate the invention, other basic alkali metal compounds are useful including, for example, potassium hydroxide and lithium hydroxide. The preferred carboxyethyl starch may be prepared, for example, as disclosed in U.S. Pat. No. 2,316,128 of Apr. 6, 1943.

In the preferred form of this invention, the starch is initially slurried in water, the slurry made alkaline (> pH 12) with sodium hydroxide and acrylonitrile is added to the slurry. In order to form the sodium carboxyethylated product, from about 10 to about 70 percent of acrylonitrile is added to the slurry, based on the weight of the starch. After the acrylonitrile has reacted with the starch, there are amide groups and nitrile groups present in the product. After a short aging period, most of these groups hydrolyze providing predominantly carboxyethyl groups and leaving a smaller number of amide groups and possibly some nitrile groups.

The carboxyalkylated starch of this invention is preferably a substantially water-soluble carboxyalkylated starch, however, the average degree of substitution of carboxyalkyl groups per glucose unit of the starch molecule will range from about 0.1 up to a theoretically possible 3. Those derivatives having a D.S. of 1.5 to 3 are alkali-soluble. As the degree of substitution is increased, the degree of water-absorbency of the salt of carboxyalkylated starch increases.

Viscose which is suitable for forming filaments is well known in the art and need not be described in detail here. In general, alkali cellulose is reacted with carbon disulfide and the resulting sodium cellulose xanthate is diluted with aqueous caustic to produce a viscose of the desired cellulose and alkali content. Additives or modifiers may be mixed in the viscose, if desired.

The sodium carboxyethylated starch is deaerated and mixed, preferably by injection, usually with a metering pump, into the viscose stream as it is being pumped to the spinnerets. The sodium carboxyalkylated starch-viscose mixture may be passed through a blender or homogenizer to obtain a more thorough dispersion, if desired.

The amount of carboxyalkylated starch present in the alloy fiber is such as to provide a fiber wherein the matrix is regenerated cellulose which has the carboxyalkylated starch dispersed therein. Preferably, the starch derivative is present in the alloy fiber in an amount such that the weight of the carboxyalkyl groups ranges from about 0.5 to about 3 percent based on the weight of the conditioned alloy fiber.

After spinning, coagulating and regenerating the alloy fibers, they are conventionally processed, stretched, if desired, and treated with a finish. They are preferably finished before drying. If the gel fibers are not in the salt state, they must be treated with a salt-forming solution to return the starch derivative from the acid state to a salt. This may be accomplished in the finish bath or prior thereto. The finish bath is preferably prepared with an alkali, alkaline earth or ammonia salt former and fiber lubricating surfactants but may consist of other finish systems. Examples of lubricant finishes for cellulose fibers include sodium oleate, oleic acid, partial fatty acid esters of sorbitan or mannitan and the polyoxyethylene derivatives thereof. Any of the previously mentioned salt-formers, if compatible, may be incorporated in the finish bath.

The dried fiber, usually in the form of staple, is shipped to the manufacturer of the absorbent articles. The absorbent articles may require carding of the fibers which is accomplished in the usual manner without difficulty.

In tampon application, the fibers are formed into the tampon in accordance with any desired procedure. They may be blended with any other fibers which may or may not serve to enhance the properties of the absorbent articles. Some fibers with which the alloy fibers of this invention may be blended include rayon, cotton, chemically modified rayon or cotton, cellulose acetate, nylon, polyester, acrylic, polyolefin and similar fibers.

The alloy fibers of this invention are useful fiber components of woven and non-woven textiles to provide absorbent pads, towels, garments and the like.

The fluid holding capacity of the alloy fibers described in Example I was determined in accordance with the following procedure.

Sample staple fibers are carded or well opened, conditioned and two grams placed in a one inch diameter die. The fibers in the die are then pressed to 0.127 inch thickness for 1 minute, removed and placed on a porous plate (e.g., a Buchner funnel) so that the one inch diameter foot of a plunger weighing 2.4 pounds rests on the test pellet. (The plunger is held in a vertical position and is free to move vertically). The pellet is then wetted with water which flows into the funnel from the stem which is connected by a flexible tube to a dropping bottle, the flow of water being controlled by the position of the dropping bottle. After 2 minutes immersion, the water is drained for three minutes, the wet pellet is removed and weighed. The fluid holding capacity of the fibers in cc./g. is one-half the weight of water in the test pellet.

To demonstrate this invention, the following example is set forth.

EXAMPLE I

Unmodified corn starch was slurried in water at a solids concentration of 20 percent by weight. The slurry was made alkaline by the incorporation of sufficient sodium hydroxide to raise the pH above 13. The solution now contained 9 percent starch and 6 percent sodium hydroxide. Acrylonitrile was added to the slurry and the slurry thoroughly mixed. The solution was aged for 20 hours, deaerated and injected through a metering pump into the viscose being pumped to the spinneret in a conventional viscose fiber spinning machine. The viscose composition was 9.0 percent cellulose, 6.0 percent caustic and 32 percent carbon disulfide based on the weight of the cellulose. The viscose ball fall was 70 and its common salt test was 8.

The sodium carboxylated starch-viscose mixture was spun through a 4500 hole spinneret into an aqueous spinning bath consisting of 7.5 percent by weight of sulfuric acid, 18 percent by weight of sodium sulfate and 3.5 percent by weight of zinc sulfate. The alloy fibers passed through the bath and were cut into staple, washed successively in water, sodium sulfide, water, dilute sulfuric acid and water. The wet gel fibers were then passed through an alkaline finish bath consisting of 1 percent by weight of sodium carbonate and one-half percent by weight of sorbitan monolaurate (Span 20). The fibers were cut, dried and tested for fluid holding capacity. The cardability of all fibers produced was noted and found to be good. The fluid holding capacities of fibers prepared as described above but with varying amounts of acrylonitrile, are shown in the following table:

Table I

| % Acrylonitrile (B.O.S.*) | Ratio Starch to Dry Fiber | Fluid Held cc./g. |
|---|---|---|
| 0 | 0 | 2.85 |
| 23 | .20 | 2.95 |
| do. | .30 | 5.55 |
| 33 | .20 | 4.65 |
| do. | .30 | 5.70 |
| 43 | .20 | 5.00 |
| do. | .30 | 5.60 |

*B.O.S. - Based on weight of the starch

From the above data, it is seen that the alloy fiber of this invention has good fluid holding capacity which may be varied as desired. Along with the high fluid holding capacity, the fiber is produced with an inexpensive drying procedure.

EXAMPLE II

Various alloy fibers were prepared in accordance with the procedure of Example I except that the ratio of starch to dry fiber was maintained in each case at 0.30 and the wet gel fibers were passed through aqueous finish baths consisting of 1/10 molar solutions of various salt-forming compounds and 1/10 weight percent of sorbitan monolaurate.

The fluid holding capacity for those alloy fibers was determined in the Syngyna Method as described by G. W. Rapp in "A Comparison of the Absorptive Efficiency of Commercial Catamenial Tampons" published June, 1958 by the Dept. of Research, Loyola University, Chicago, Illinois. This test is generally described in U.S. Pat. No. 3,699,965. In the present case, water was the fluid employed in the Syngyna test.

The following table sets forth the results of testing of the alloy fibers in this test procedure.

Table II

| Salt Former | Fluid Held, cc./g. | Fiber pH |
|---|---|---|
| Control* | 4.2 | — |
| Magnesium acetate | 6.18, 6.10, 5.76 | 6.0 |
| Magnesium chloride | 5.06, 6.49, 5.48 | 4.75 |
| Calcium acetate | 5.24 | — |
| Calcium chloride | 5.42 | — |
| Zinc acetate | 5.80, 5.59 | 5.7 |
| Zinc sulfate | 5.00, 5.55 | 5.1 |

*Ordinary rayon fibers

It can be seen from the above data that these alloy fibers containing various salts of carboxyethyl cellulose have high fluid holding capacity and may be advantageously employed where non-alkaline fibers are desired.

EXAMPLE III

Several alloy fibers were prepared and tested in accordance with the procedure of Example II except that several nitrogenous salt-forming compounds were employed at various concentrations.

The following table sets forth the results of testing of these alloy fibers.

Table III

| Salt Former | | Fluid Held, cc./g. |
|---|---|---|
| Dimethyl amine (0.4% solution) | | 5.55 |
| Pyridine (1% solution) | | 4.29 |
| Ammonium hydroxide | (0.3% sol.) | 4.93 |
| do. | (0.6% sol.) | 5.12 |
| do. | (1.2% sol.) | 5.42 |
| do. | (2.4% sol.) | 6.10 |

It can be seen from the above data that these alloy fibers containing various nitrogenous salts of carboxyethyl cellulose have improved high fluid capacity.

Various changes and modifications may be made in practicing the invention without departing from the spirit and scope thereof and, therefore, the invention is not to be limited except as defined in the appended claims.

I claim:

1. An absorbent alloy fiber comprising a regenerated cellulose matrix containing a salt of carboxyalkylated starch uniformly dispersed therein, said regenerated cellulose being a major proportion of the fiber mass.

2. The absorbent alloy fiber of claim 1 wherein the salt is an alkali-metal salt.

3. The absorbent alloy fiber of claim 1 wherein the salt is an alkaline earth metal salt.

4. The absorbent alloy fiber of claim 1 wherein the salt is an ammonium salt.

5. The absorbent alloy fiber of claim 1 wherein the salt is an amine salt.

6. The absorbent alloy fiber of claim 1 in the form of a non-woven textile.

7. The absorbent alloy fiber of claim 1 in the form of a tampon.

* * * * *